United States Patent [19]

Juan

[11] Patent Number: 5,344,276
[45] Date of Patent: Sep. 6, 1994

[54] STATIONARY POSITIONING DEVICE FOR A HANDLING TROLLEY HAVING EXTENDABLE CENTERING FINGER ASSEMBLY

[76] Inventor: Richard Juan, 20, rue du Pont Blanc, 69360 Saint Symphorien d'Ozon (Rhone), France

[21] Appl. No.: 969,203
[22] PCT Filed: Aug. 2, 1991
[86] PCT No.: PCT/FR91/00645
 § 371 Date: Feb. 24, 1993
 § 102(e) Date: Feb. 24, 1993
[87] PCT Pub. No.: WO92/02396
 PCT Pub. Date: Feb. 2, 1992

[30] Foreign Application Priority Data
 Aug. 3, 1990 [FR] France .................... 90 10164

[51] Int. Cl.$^5$ .............................................. B65G 35/06
[52] U.S. Cl. .................................. 414/584; 104/88 R
[58] Field of Search ..................... 104/35, 88, 307; 105/463.1; 280/763.1; 414/396, 401, 584

[56] References Cited

U.S. PATENT DOCUMENTS

| | | | |
|---|---|---|---|
| 3,918,366 | 11/1975 | Noah | 104/307 |
| 4,538,950 | 9/1985 | Shiomi et al. | 414/396 X |
| 4,597,709 | 7/1986 | Yonezawa | 414/401 X |
| 4,655,667 | 4/1987 | Plumb et al. | 414/401 X |
| 4,773,811 | 9/1988 | Wasner | 414/396 X |
| 4,818,171 | 4/1989 | Burkholder | 414/401 X |
| 4,846,073 | 7/1989 | Boyer et al. | 104/88 |
| 4,950,119 | 7/1990 | Nord et al. | 414/401 X |

FOREIGN PATENT DOCUMENTS

0343804 11/1989 European Pat. Off. .
2456653 12/1980 France .

*Primary Examiner*—Robert J. Oberleitner
*Assistant Examiner*—S. Joseph Morano
*Attorney, Agent, or Firm*—Oliff & Berridge

[57] ABSTRACT

A trolley has a chassis provided with a load-carrying assembly and a drive unit for imparting a longitudinal translational motion to the trolley. A centering finger has the shape of a polygonal cross-section, vertical-axis pyramid having downwardly-converging edges. The centering finger is supported by an element that rotatably fastens the centering finger to the chassis. The centering finger is connected to a device that can move the finger between a retracted position that is above the floor and an extended position where the finger engages a matching recess housed in a ring, which is, in turn, set into the floor. The recess is positioned in such a way that the vertical axis of the recess passes through the intersection between the longitudinal and transverse axes of a reference point and a theoretical path of the trolley, and at least one of the sides of the recess is perpendicular to the theoretical path.

22 Claims, 6 Drawing Sheets

STATIONARY POSITIONING DEVICE FOR A HANDLING TROLLEY HAVING EXTENDABLE CENTERING FINGER ASSEMBLY

The increasingly extensive automation of production means inspires one to consider the automation of means for handling products between the manufacturing stations, and in particular to automate the handling trolleys transporting machined components between scattered machines, or between the manufacturing means and an assembly, storage or packaging site.

BACKGROUND OF THE INVENTION

Trolleys of this type are necessarily autonomous, they carry batteries to power them and are associated with driving means, such as guide by wire, optoelectronic guidance, trigonometric direction finding using laser or other means, reacting on the means for controlling their drive means.

In general, the displacement of an autonomous trolley is accomplished at a stable speed (of the order of 30 to 120 meters per minute), and stopping is preceded by a deceleration phase to a slow final positioning speed. This technique, associated with correct mastery, on the one hand, of the means for detecting the longitudinal position of the trolley and, on the other hand, of the drive means acting on the means for driving this trolley in translation, makes it possible to obtain a longitudinal precision of the order of plus or minus one, which is satisfactory or at least sufficient so as not to disturb a subsequent precision positioning. The transverse precision, measured perpendicularly to the direction of displacement, is clearly less accurate because it depends not only on surface imperfections of the ground, but also on the flatness of the latter. The result is that, even with a trolley having excellent constructional and functional qualities, imperfections of the ground alone bring about a transverse displacement of the trajectory of the trolley with respect to its theoretical trajectory. This displacement, called a deviation, may be of the order of several centimeters for a journey of several meters. A deviation of this value is unacceptable and must be corrected, otherwise with each change of direction, even with a precise angular rotation, it modifies the heading of the trolley and increases the imprecision of this positioning, that is to say the deviation between its actual transverse positioning and its theoretical positioning.

One solution includes acting on the guiding wheels of the trolley in order to accomplish heading corrections, subsequently checked by a positioning detector, but that leads to a continuous succession of correction and detection operations and cannot be applied to trolleys which do not comprise guiding wheels, but comprise other means allowing them to pivot in situ.

SUMMARY OF THE INVENTION

The object of the present invention is to provide a positioning device for a handling trolley, autonomous or otherwise, allowing it, at particular points of its trajectory, to be brought rapidly into its theoretical position or into the theoretical position for transferring the component or load which it carries.

This device, which can be applied to a trolley comprising a chassis fitted with means for receiving a load and with means for driving at least in longitudinal translation, comprises at least one centering finger which, in the form of a pyramid of polygonal cross section, of vertical axis and having downwardly converging ridges, is carried by means wedging it rotationally with respect to the chassis and is connected to means able to displace it between a transport position in which it is above the ground, and a positioning position in which it is engaged in a recess having the same shapes and dimensions as itself and made in a ring arranged in the ground, this recess being positioned in the ground so that its vertical axis passes through the intersection of the longitudinal and transverse axes of a point of reference of the theoretical trajectory of the trolley and so that at least one of its faces is perpendicular to this theoretical trajectory.

Thus, when the trolley is stopped in a zone necessitating repositioning, the centering finger is lowered in the direction of the recess arranged in the zone. Its sloped faces encounter those of the recess which, by their fixed nature, transversely guide the finger until its axis coincides with that of the recess. This positioning is only made possible by virtue of the angular wedging of the finger with respect to the chassis of the trolley and the mobility of the trolley in the horizontal plane, therefore equipped with pivoting guiding wheels.

In one embodiment which can be applied more particularly to trolleys which do not comprise guiding wheels, or which possess guiding wheels having a small capacity for moving transversely to the positioning station, the device comprises, on the one hand, means linked to the chassis in order to provide, in the positioning phase, an upwards vertical displacement at least of the chassis and its means for driving in longitudinal translation and, on the other hand, means tolerating a transverse displacement of the chassis in the raised position.

With this arrangement, the finger is only inserted into the recess after the chassis of the trolley has been raised in order to eliminate any problem of friction between the ground and the wheels, or any other means for driving in translation. In that way, when the finger is inserted into the recess and by virtue of the means tolerating a transverse displacement of the chassis, the forces exerted by the faces of the recess on those of the finger are sufficient to displace the chassis and position its vertical axis to coincide with the theoretical one, formalized by the recess.

The invention also relates to trolleys with non-guiding wheels in which the means providing the vertical displacements of the chassis consist of means providing its rotation in situ and comprising at least one slide which can move in vertical slideways of the chassis, drive means able to displace this slide vertically and in both directions, and a lower plate connected to the slide and carrying a ring which, free to rotate, is connected to rotational drive means and is able to come to bear on the ground.

In this embodiment, the centering finger is mounted to rotate freely on a shaft with which it is mounted so as to slide in a vertical bearing, whilst, on the one hand, the aforementioned bearing is interposed between the slide to which it is securely fastened and the plate to which it is connected with the possibility of transverse translation at least in one direction, on the other hand, the centering finger-sliding shaft assembly is coupled to means able to displace it vertically with respect to the bearing, at least in the positioning phase of the chassis, and, in addition, the plate carries a precentering assembly composed of a conveying disk mounted to float vertically with respect to the plate, and a precentering core mounted to float radially with respect to the disk and provided with a lower snout aligned with an upper recess, snout and recess having the same shapes, and dimensions as the centering finger.

With this device, during the downward descent of the plate to bring the ring to bear on the ground, the precentering assembly is freely positioned on the recess, before being translationally wedged by the plate resting on it. Next, whilst the ring is bearing on the ground, and during the elevation of the chassis, the centering finger is lowered in the direction of the recess of the precentering assembly. The contact of its faces with those of this precentering recess brings about the displacement of the chassis with respect to the ring and to the plate and causes the reference axis of the chassis to coincide with that of the precentering recess, but also with that of the centering recess.

After this positioning, the chassis may immediately be lowered again and the slide raised, because the transverse deviation is then corrected.

The trolley may also be pivoted through the desired angle, after positioning and before lowering, by rotation about the reference axis and by driving with bearing on the ring, now decentered, without that modifying the precise positioning of the trolley.

It would thus appear, regardless of its embodiment, that the device according to the invention makes it possible perfectly to compensate for the transverse deviation of a trolley, but also for its longitudinal deviation, both during a change of direction and when stationary in a transfer zone, and with a precision which is independent of the mass of the load carried.

Other characteristics and advantages will emerge from the description which follows by reference to the appended diagrammatic drawing representing, by way of non-limiting examples, several embodiments of this device.

BRIEF DESCRIPTION OF PREFERRED EMBODIMENTS

DETAILED DESCRIPTION OF PREFERRED EMBODIMENTS

Figure 1:
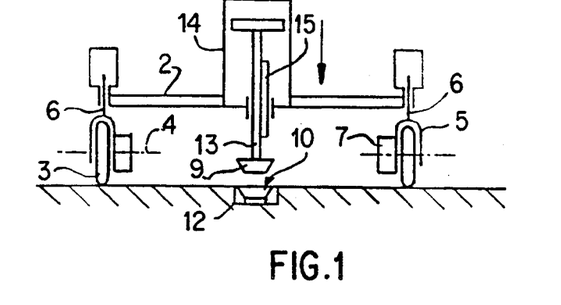
FIG. 1 is a side view in transverse section showing, in a diagrammatic fashion, a first embodiment of the device in the scope of its application to a trolley fitted with wheels articulated about a vertical pivot.

The handling trolley represented in FIG. 1 is composed of a chassis 2 able to support a load, with the aid of any suitable means, and whose wheels 3 are articulated about a horizontal spindle 4 carried by a clevis 5. This is mounted to rotate freely in the chassis on a vertical pivot 6. This trolley may have manual displacement or motorized displacement, in which case at least some of these wheels are fitted with drive means 7 able to drive their spindle 4 in rotation. Likewise, the pivots 6 may be mounted to rotate freely with respect to the chassis, or be associated with motors 8 bringing about their rotation, under the action of a control, not shown.

Figure 2:
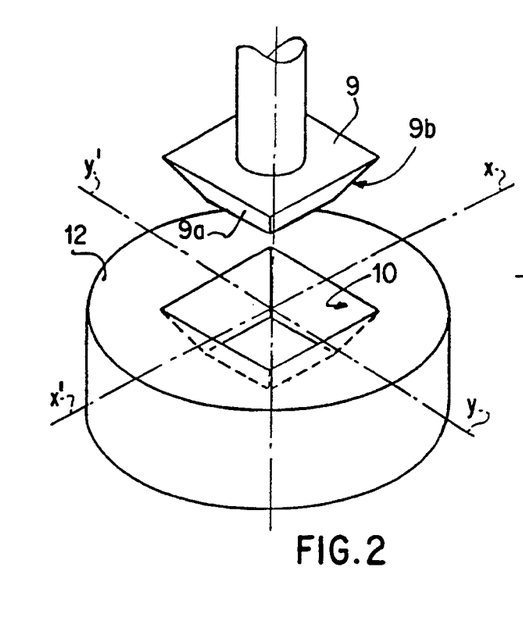
FIG. 2 is a partial view in perspective showing, on a larger scale, the centering finger and the recess of the device.

According to the invention, this trolley is fitted with means for positioning it when stationary, means essentially composed of two elements, namely a centering finger 9 and at least one centering recess 10. FIG. 2 shows that the centering finger has, at least at its end, the shape of a pyramid of polygonal cross section and, more particularly, the shape of a truncated pyramid of square cross section. The recess 10, which is made in a ring 12 wedged into the ground, has the same shapes and dimensions as the centering finger 9. The ring 12 is wedged into the ground so that the vertical axis of the recess 10, represented by the point OT in FIG. 3, is at the intersection of the longitudinal axes X'X and Y'Y of a reference point of the trajectory of the trolley and so that one of the faces of this recess, for example those 10a and 10b in FIG. 3, are perpendicular to the theoretical displacement trajectory X'X of this trolley.

In the embodiment of FIG. 1, the centering finger 9 is wedged at the end of the rod 13 of a jack whose body 14 is fixed to the chassis 2. This rod 13 is associated with means, such as a key 15, rotationally wedging the centering finger, so that this finger is always in the same position with respect to the chassis 2, that is to say has transverse faces 9a-9b always arranged perpendicularly to the actual longitudinal axis of the trolley.

Figure 3:
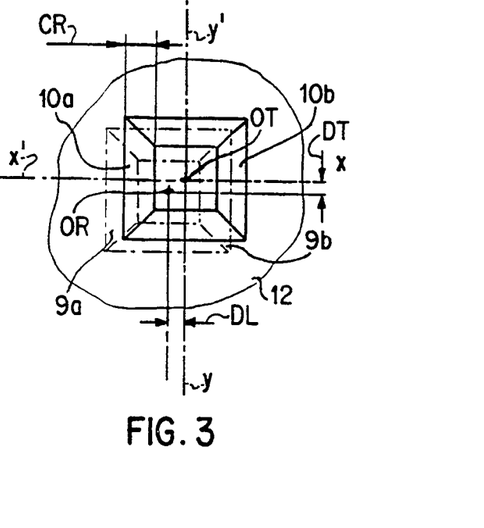
FIG. 3 is a plan view from above illustrating the operational principle of the centering finger and of the recess.

Thus, when the trolley stops in the positioning zone with its centering finger 9 above the recess 10, and as FIG. 3 shows in chain line, by virtue of the transverse deviation DT and of the longitudinal deviation DL, the point OR corresponding to the longitudinal axis of the centering finger 9 is offset with respect to the theoretical point OT. In order to position the trolley precisely, it is sufficient, possibly after having rotationally freed the pivots 6 of the wheels 4, to cause the downwards displacement of the centering finger 9 in the direction of the recess 10. As soon as two of the faces of the finger come into contact with the corresponding faces of the recess, the latter, due to their fixed nature, exert on the faces of the finger perpendicular forces tending to bring back the vertical axis of this finger to coincide with that of the recess and thus causing by virtue of the pivotable mounting of the wheels 6, the displacement of the chassis 2 in the direction for correcting the positional offsets. As soon as the centering finger 9 is engaged, without any peripheral play in the recess 10, the centering or repositioning of the trolley 2 is ensured, and one can then proceed with a new displacement or a transfer operation, including depositing, on the trolley, a load coming from a machine or from a storage member, or in depositing, on a machine or storage member, a load which up until now was on the trolley.

Figure 4:
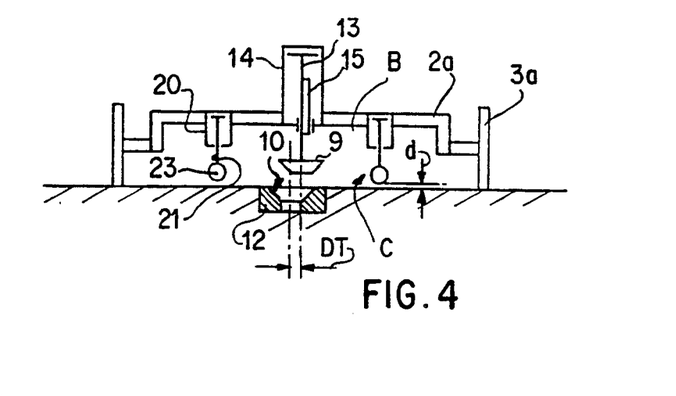
FIGS. 4 to 6 are diagrammatic views, in partial section, showing an embodiment of the device in various positions, in the case of it being applied to a trolley fitted with wheels which are not articulated in the vertical plane.
Figure 6:
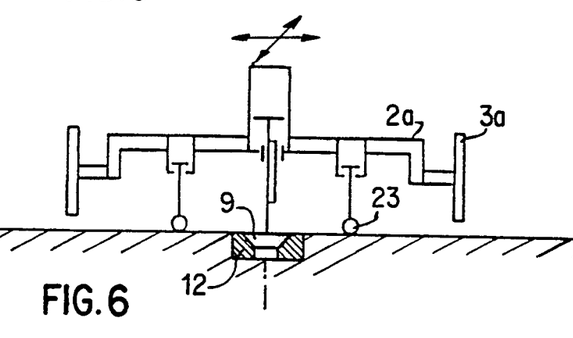
Figure 7:
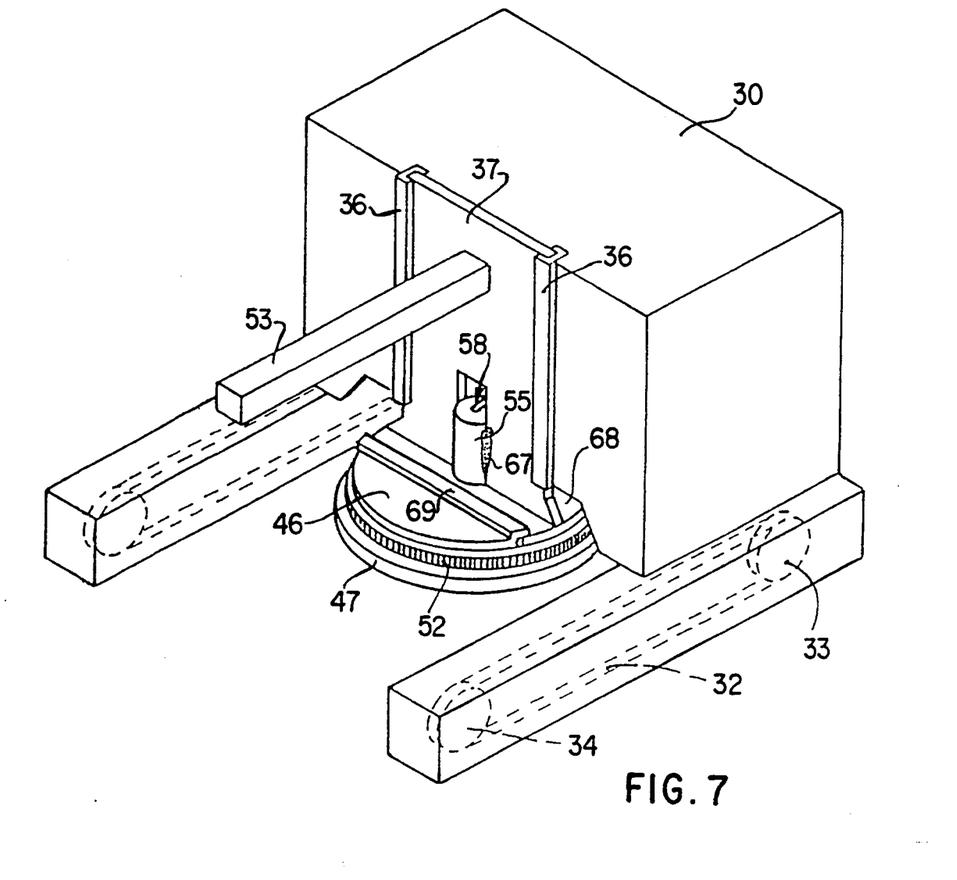
FIG. 7 is a view in perspective showing the application of the device to a coil-carrying autonomous trolley, with rotation in situ.

FIGS. 4 and 6 show the application of the positioning device to a trolley chassis 2a and fitted with means for longitudinal translation and, for example, with wheels 3a mounted to rotate freely about transverse spindles 4, but without the possibility of pivoting about a vertical axis. Under these conditions, in order to allow the translational movements of the chassis 2a during the engagement of the centering finger in the recess 10, the positioning device described previously is combined with means B able to displace the chassis vertically and with means C tolerating a transverse displacement of this chassis.

Figure 5:
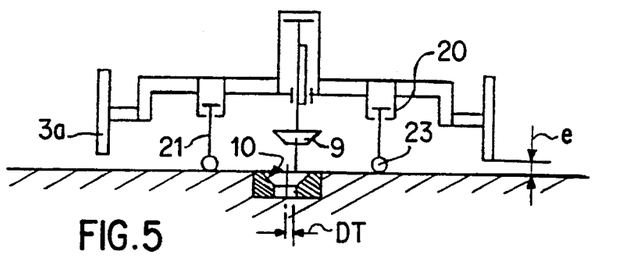

In this embodiment, the means B consist of jacks whose bodies 20 are wedged to the chassis whose rods 21 can be displaced vertically to come into contact with the ground. As regards the means C, they consist, for example, of rolling means, such as castors 23 rotationally mounted about a vertical pivot at the end of the rods 21 of the jacks.

In the rest position, and as shown in FIG. 4, the rods 21 of the jacks are retracted into the up position so that the castors 23 are separated from the ground by a distance d.

At the positioning station, and after the trolley has stopped, the jacks are powered so that the rods 21 descend vertically downwards in the direction of the ground. As soon as the castors 23 have come into contact with the ground, the movement of the jacks is extended until the wheels 3a, or the other means for longitudinally translating the trolley, are raised with respect to the ground by a value e, shown in FIG. 5. It is only at this moment that, as shown in FIG. 6, the positioning device is actuated so that the centering finger 9 penetrates the recess 10 and repositions the trolley with respect to the vertical reference axis. During this positioning phase, the chassis 2a of the trolley may, by virtue of the castors 23, undergo any transverse displacement on the axes X'X and Y'Y in order to recenter the load which it carries.

Of course, after the positioning operation, the means B are actuated so that they return to their original position, represented in FIG. 4, bringing the wheels 3a back into contact with the ground.

The embodiment described with reference to FIGS. 7 to 15 relates to the application of the positioning device to an autonomous trolley not comprising any guiding wheels but comprising means allowing it to pivot in situ.

This trolley is therefore composed of a chassis generally denoted by 30 and whose means for driving in longitudinal translation consist of lateral caterpillar tracks 32 going from drive wheels 33 to return wheels 34. The drive wheels are driven by a motor 35 carried by the chassis 30. This chassis also carries, able to move vertically in slideways 36, a slide 37 which is connected to drive means able to impart to it a vertical displacement in both directions. In the embodiment shown, these drive means consist of a motor 38 driving, via a pulleys and belts transmission 39, a screw 40 mounted so as to rotate freely in two plates 42 and 43 connected to the chassis. The screw 40 interacts with a nut 44 which, connected to the slide by a cross-member 45, is consequently rotationally wedged. The slide 37 carries a plate 46 with respect to which a ring 47 is mounted so as to rotate freely which, as will be detailed later, comes to bear on the ground. An electric motor 48, carried by a support connected to the plate 46 is able to drive a gear 50 engaging a toothed ring 52 made at the periphery of the ring 47.

Since the trolley represented in FIGS. 7 to 15 is more especially intended for transporting coils, the slide 37 is securely fastened to a horizontal spur 53 projecting towards the front of the trolley. It is clearly evident, however, that the invention applies to a trolley which may comprise any other load gripping or transporting means, such as a plate or forks, provided that these elements are fixed to the slide 37.

Figure 13:
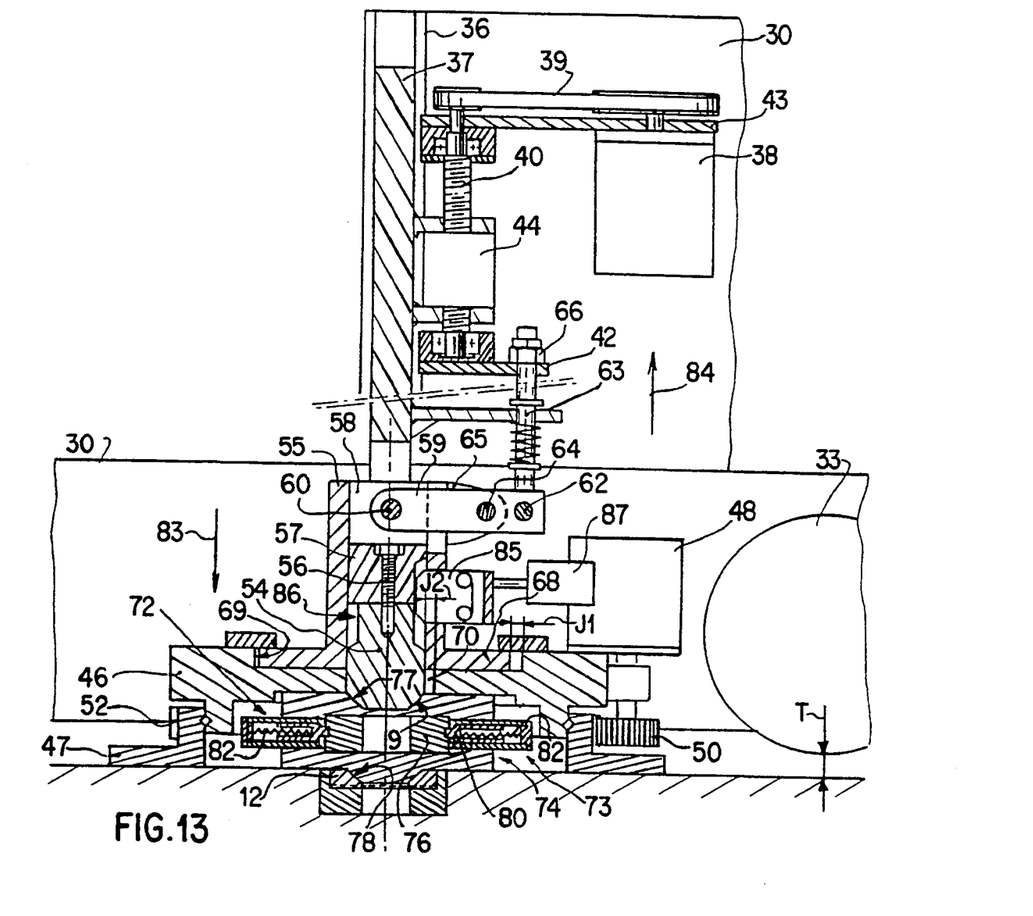
FIG. 13 is a side view in longitudinal section similar to FIG. 8 but showing, in more detail, the constituent elements of the device.

In this embodiment, and as shown in more detail in FIG. 13, the male centering element 9 is formed at the end of a cylindrical finger 54 mounted so as to rotate freely in a vertical bearing 55. The finger 54 is connected, with play, by an axial screw 56, to a shaft 57 mounted so as to be free to translate vertically with it in the inner bore of the bearing 55. This shaft 57 is provided, at its upper end, with a slit 58 of longitudinal direction for the passage of an actuating lever 59. The front end of this lever is articulated to a pin 60, arranged transversely in the shaft 58. The rear end of the lever is articulated to a transverse pin 62, securely fastened to a vertical rod 63. Finally, the lever is articulated at 64 to a tab 65 securely fastened to the bearing 55. The upper end of the rod 63 passes through the plate 42 contributing to the positioning and to the holding of the vertical screw 40 and is provided with a nut 64.

The bearing 55 is interposed between the slide 37 and the plate 46. It is connected to the slide 37, for example by welds 67 which can be seen in FIG. 7. It is securely fastened to a base 68 of rectangular shape which is mounted so as to slide in a slideway 69 of the plate 46.

Figure 12:
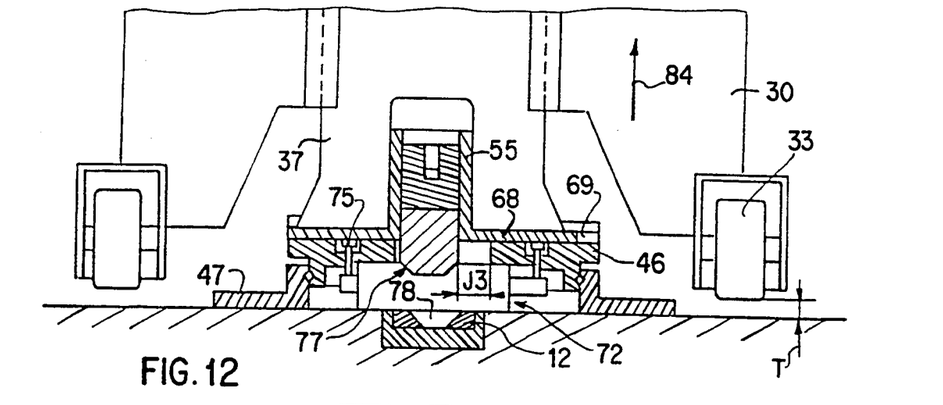

In this embodiment, the base 68 and the slideway 69 are arranged so as to tolerate relative sliding between the bearing 55 and the plate 46 in a direction which is transverse, that is to say which is perpendicular to the trajectory of longitudinal displacement of the trolley. If need be, and as will be explained later, the base 68 is mounted in the slideway 69 with longitudinal play, represented diagrammatically by J1 in FIG. 13. When this longitudinal play J1 is provided between the base and the plate, play J2, of at least equal value, is provided longitudinally between the finger 54 and the bore 70 made in the plate 46 for the passage of this finger. FIG. 12 moreover shows that this bore 70 is transversely oblong so as to provide greater transverse play J3 between the finger 54 and the plate 46.

In this embodiment, the centering finger 54 is associated with a precentering assembly, denoted generally by 72, and composed of a conveying disk 73 and of a precentering core 74. The conveying disk is arranged below and inside the plate 46 to which it is connected by vertical screws 75 visible in FIGS. 9 to 12. In practice, it is hung by these screws so as to have a possibility of vertical displacement with respect to this plate.

The precentering core 74 is composed, as shown in more detail in FIG. 13, of two elements, respectively an upper element and a lower element, connected to one another while clamping between them a central core 76. The upper and lower parts of the core are mounted with the possibility of sliding, in the horizontal plane, with respect to the conveying plate 73. The upper element of the precentering core is fitted with a precentering recess 77, whilst the lower element of this core is provided with a precentering snout 78. The recess 77 and the snout 78 have, of course, the same shapes and dimensions as the recesses 10 and centerer 9 and are positioned in the same fashion as the pyramid-like shape of the centerer 9 of the centering finger.

Finally, FIG. 13 shows that the disk 73 comprises radial housings which are at least three in number, for return pushrods 80 bearing, under the action of compression springs 82, on the central bush 76 trapped between the two elements of the precentering core 74.

Figure 8:
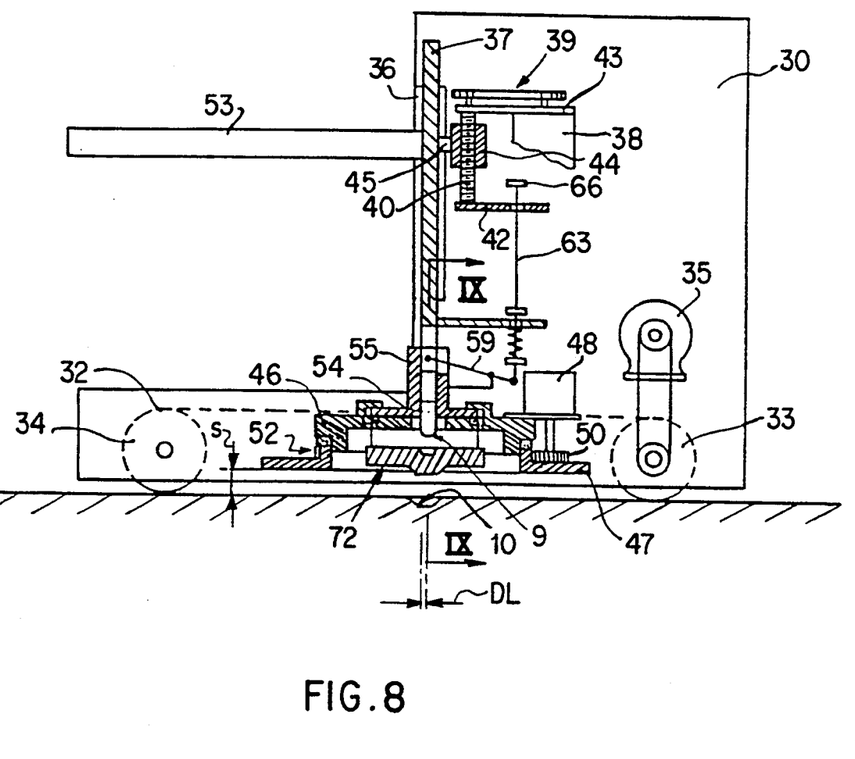
FIG. 8 is a diagrammatic side view in transverse section showing the essential elements of the trolley of FIG. 7, FIGS. 9 to 12 are partial views in transverse section along IX—IX of FIG. 8 showing, on a larger scale, the elements of the device in various phases of its operation.
Figure 9:
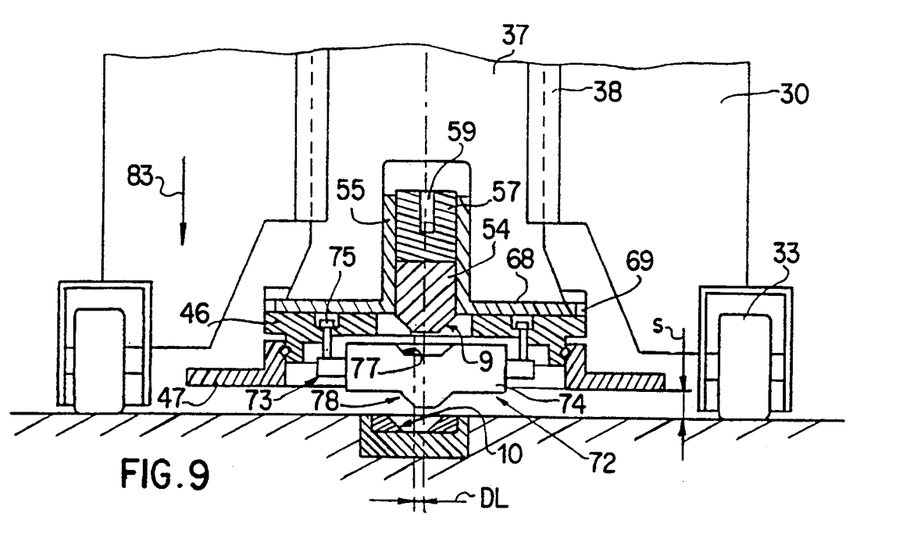
Figure 14:
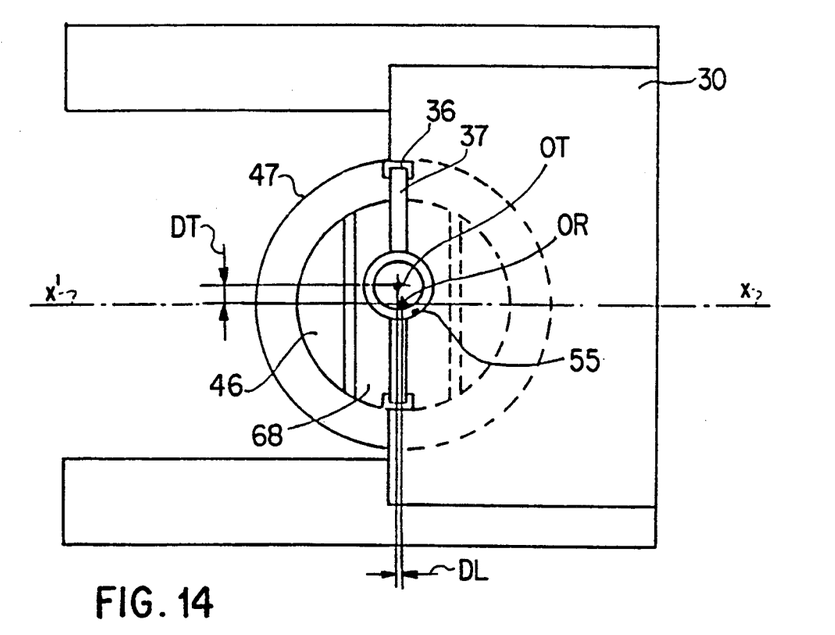
FIGS. 14 and 15 are plan views from above of the trolley of FIGS. 7 to 13 showing how deviation is compensated, with and without rotation.

When the trolley is in the transport position, and as shown in FIGS. 8 and 9, the ring 57 is distant from the ground by a distance S, having a value of the order of 50 mm, the precentering assembly 72 hangs under the plate 46 without being in contact with the ground, the lever 59 for actuating the finger 54 is inclined and tends to raise this finger with respect to the bearing 55, and the rod 63 is in a position such that its nut 66 is not in contact with the plate 42. When the trolley arrives in a positioning zone, and more precisely when it is stopped above this zone, its actual vertical axis, represented by the point OR in FIG. 14, is offset with respect to the theoretical vertical axis represented by the point OT in FIG. 14. These off-centered features depend upon the transverse deviation DT and on the longitudinal deviation DL. In FIG. 14, the longitudinal deviation DL is less than the transverse deviation DT in order to show that it is possible, in the deceleration phase before stopping, to adjust this deviation by varying the duration for which power is supplied to the means bringing about the longitudinal displacement of the trolley.

In order to proceed with repositioning the trolley with respect to the reference axis perfectly delimited by the recess 10 of the ring 12 arranged below the trolley, it is sufficient, as in the preceding embodiments, to cause the downward vertical displacement of the centering finger 9, therefore of the slide 37 which carries it, in the direction of the arrow 83.

Figure 10:
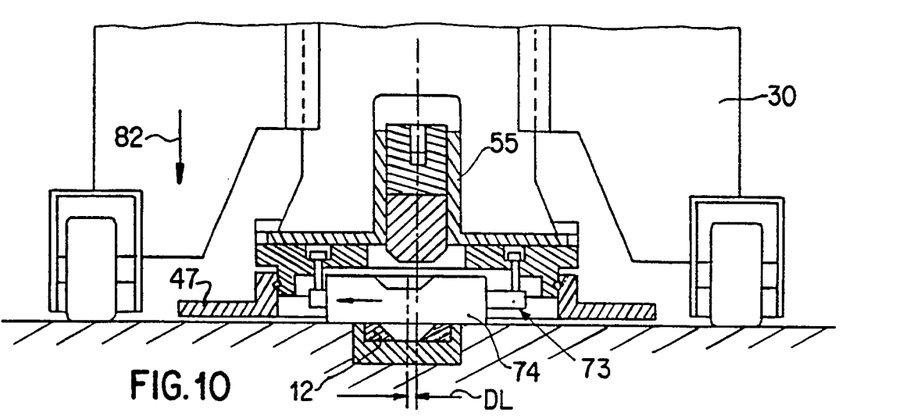

In a first instance, and as shown in FIG. 10, the precentering finger 78 engages in the recess 10 and positions itself freely by virtue of the floating mounting of the precentering core 74 with respect to the conveying disk 73. FIG. 10 clearly shows that this precentering is accomplished even while the ring 47 is not yet bearing on the ground.

Figure 11:
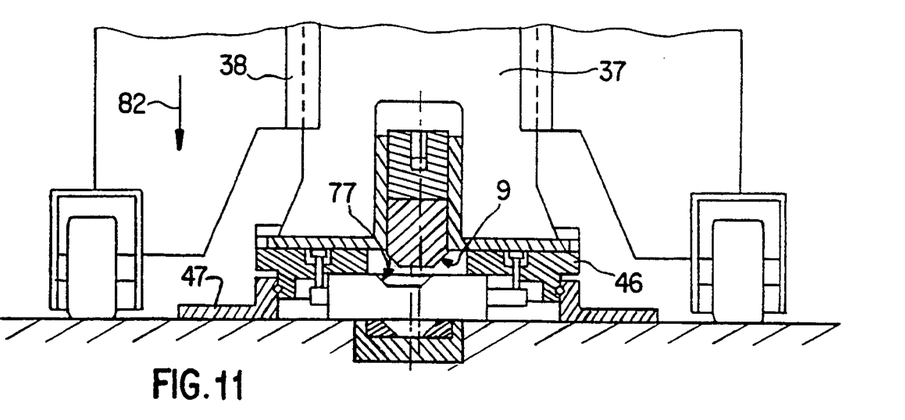

In a second phase shown in FIG. 11, the ring 47 comes to bear on the ground and thus allows the plate 46 to bear on the precentering assembly 72, which is thus wedged and securely fastened to the plate 46 and to the ring 47.

In a following phase, and by virtue of keeping in rotation the screw 40 interacting with the nut 44 of the slide 37, and due to it being impossible for the slide to continue its downward movement, it is the assembly of the chassis which is displaced vertically upwards in the direction of the arrow 84 of FIG. 12, thus bringing about the raising of the means for rotationally driving the chassis, namely the caterpillar tracks 32 with their drive wheels 33 and their return wheels 34. At the end of this movement, and as shown by FIGS. 12 and 13, the means for driving in translation are raised from the ground by a value T, which is between 5 and 10 mm.

FIG. 13 shows that, during this elevation movement of the chassis, the plate 42 comes into contact with the nut 66 of the rod 63 and thus exerts a traction movement on this rod in the direction of the arrow 84. Via the intermediate bearing lever 59, this movement is transmitted in the opposite direction, that is to say in the direction of the arrow 83 and with multiplication, to the finger 54. The result thereof is that the centerer 9 of this finger comes into contact with the precentering recess 77 which, due to its arrangement coinciding with the theoretical vertical, is off-centered with respect to the actual vertical axis of the slide and consequently with that of the chassis of the trolley. During this vertical movement of the centering finger 54, the faces of the precentering recess 77 behave like the faces of the recess 10 in the preceding embodiments and guide the centering finger 9 so that, at the end of the movement, the respectively theoretical and actual axes of the chassis 30 coincide. This recentering of the axis of the trolley is made possible, transversely, by the sliding of the base 68 of the bearing 55 with respect to the plate and, longitudinally, by another sliding permitted by the play J1 and J2.

At the end of this operation, and as shown in FIG. 14, the assembly of the trolley is correctly positioned on the theoretical axis represented by the point OT, with the exception of the ring 47, of the plate 46 and of the precentering assembly 72 which itself remains centered on the point OR.

If the positioning is accomplished solely in order to correct the deviation of the trolley, at an intermediate positioning point on a long longitudinal trajectory, it is possible here to bring the trolley into contact with the ground and to return the assembly of the centering device to its transport position represented in FIGS. 8 and 9. In contrast, if this positioning is accomplished in a zone in which the trolley must be subjected to a change in trajectory, that is to say a rotation, the procedure is then, with the trolley in the position represented in FIG. 13, to set this trolley in rotation by means of the motor 48. Under these conditions, since the ring 47 is bearing on the ground, the rotation of the gear 50 brings about, by the meshing of its teeth with those 52 of this ring, the rotation of the assembly of the trolley with respect to this ring, with the exception of the finger 54 and of the precentering assembly 72. It should be reiterated here that the finger 54 is mounted to rotate freely with respect to the shaft 57 which is itself driven by the rotational movement.

Figure 15:
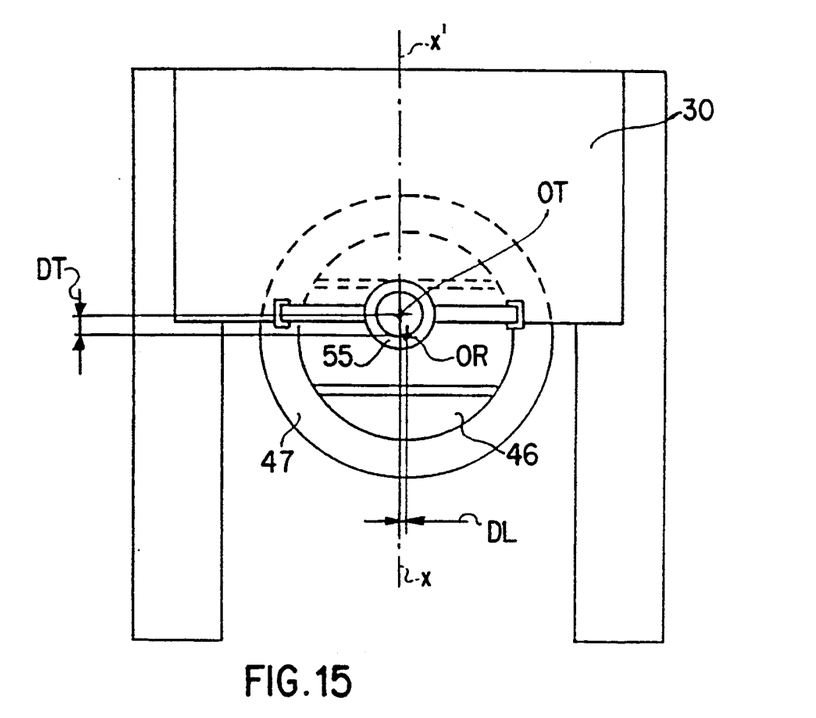

When the assembly has pivoted through the desired angle, for example through 90° as shown in FIG. 15, one can then proceed with depositing the trolley on the ground and returning the positioning device to its transport position.

Advantageously, and in order to ensure the angular precision of the rotation, the centering finger 9-54 is associated with indexing means which, in the embodiment shown in FIG. 13, consist of an indexing finger 85 mounted so as to slide in a radial housing of the bearing 55 and able to interact with longitudinal splines 86 of the finger 54. Of course, these splines 86 are distributed over the finger with a precise angular spacing and have a transverse cross section of generally triangular shape so that their lateral faces ensure a centering of the corresponding faces of the finger 85. This finger 85 is connected to means 87 able to displace it translationally between an unobtrusive position and an indexing position. These means, consisting, for example, of an electric jack, are carried by the base 68 so as to remain securely fastened in the displacements of the latter.

FIG. 15 shows that after rotating the positioning device and returning it to the transport position, if the precentering assembly 72 can resume a centered position with respect to the plate 46 by virtue of the pushrod 80 and of the spring 82, this plate 46 and the ring 47 maintain their original position, that is to say remain centered about the axis corresponding to the point OR in FIG. 15, whilst the assembly of the trolley is centered on the axis corresponding to the point OT in this same figure. This is not troublesome because, on the one hand, the ring 47 and the plate 46 which carries it are mounted so as to slide with respect to the rest of the chassis 30 of the device and because, on the other hand, they have the sole function of bearing on the ground and of rotationally driving the chassis. FIG. 15 moreover shows that, by virtue of the rotation of the trolley, the residual offset of the plate 46 and of the ring 47, that is to say the offset which these elements will exhibit on the new trajectory of the trolley and during the next positioning operation, will have no effect on the precision of this new positioning, because the greater offset, of value DT, is situated on the longitudinal axis of the new trajectory and therefore on the axis along which the deviation is easier to correct in operation, and because the transverse offset, of value DL, has the lower value and is in any case smaller than the expected deviation.

In any case, the value of the radial travel for adjusting the positioning CR in FIG. 3, corresponding to the difference between the extreme radial dimensions of the centering finger 9 or of the recess 10, is always greater than the maximum acceptable value for the largest deviation, transverse or longitudinal, measured when the trolley is stationary after longitudinal displacement. For example, if the maximum transverse deviation is 40 mm, the value of CR will be 50 mm.

It emerges from the preceding text that the device according to the invention allows a trolley, at the extremities or at any point on the trajectory of this trolley, to be positioned easily and precisely with respect to reference axes, and this irrespective of the dimensions of the trolley, of its translation means, of its driving means and of the load transported.

Although it is particularly advantageous for autonomous trolleys, the device may also be used for any other trolley or moving body requiring, at one moment in its displacements, precise positioning.

I claim:

1. A stationary positioning device for a handling trolley, comprising:
    at least one centering finger having a shape having a polygonal horizontal cross-section and a downwardly pointing trapezoidal vertical cross-section and a set of dimensions, wherein a means for connecting the at least one centering finger to the handling trolley rotatably fastens the at least one centering finger, the at least one centering finger having a vertical axis that is positioned coincidently with a longitudinal axis of the handling trolley;
    at least one recess located in a ring-shaped structure set into a ground structure, the at least one recess having the same shape and set of dimensions as the at least one centering finger;
    means for displacing said at least one centering finger between a transport position above a ground level and a positioning position where the at least one centering finger engages the recess; and
    longitudinal and transverse axes intersecting at a reference point located along a theoretical longitudinal path of the handling trolley, wherein the recess is positioned such that a vertical axis of the recess passes through the reference point and the recess has at least one side perpendicular to the theoretical longitudinal path.

2. The device according to claim 1, wherein the shape of the at least one centering finger and of the at least one recess comprises a truncated pyramid of square cross-section.

3. The device according to claim 1, further comprising:
    means for providing upward vertical displacement linkable to the handling trolley to provide, during the positioning phase, upward vertical displacement of at least the handling trolley to a raised position and the means for driving; and
    means for tolerating a transverse displacement of the handling trolley when the handling trolley is in the raised position.

4. The device according to claim 3, wherein the means for providing upward vertical displacement of the handling trolley comprises several vertical jacks each having a body, each said body being connectable to the handling trolley and to a rod having a free end, said free end of said rod being pivotably mounted with rolling means.

5. The device according to claim 3, wherein the means for providing upward vertical displacement of the handling trolley further comprises:
    means for providing in situ rotation of the handling trolley;
    at least one slide for moving in vertical slideways of the handling trolley;
    means for displacing the at least one slide vertically in two directions;
    a lower plate connected to the at least one slide and carrying a ring free to rotate, said ring connected to a rotational drive means and able to bear on the ground;
    wherein the at least one centering finger is mounted to rotate freely on a shaft so as to slide in a vertical bearing,
    the vertical bearing is interposed between the at least one slide to which it is securely fastened and the lower plate to which it is connected to allow transverse translation in at least one direction, and
    the shaft is coupled to means for displacing the shaft vertically with respect to the vertical bearing, at least in the positioning phase of the handling trolley and wherein the lower plate carries a precentering assembly comprising:
    a conveying disk mounted to float vertically with respect to the lower plate; and
    a precentering core mounted to float radially with respect to the conveying disk and provided with a lower snout aligned with an upper recess, the lower snout and the upper recess having the same shape and set of dimensions as the at least one centering finger.

6. The device according to claim 5, wherein the vertical bearing is provided with a rectangular base mounted to slide in a slideway of the lower plate.

7. The device according to claim 6, wherein the rectangular base is mounted in the slideway to allow translation perpendicular to a direction of sliding of the rectangular base in the slideway.

8. The device according to claim 6, wherein the trolley is provided with non-guiding longitudinal translation means, and the slideway of the lower plate is arranged transversely to the longitudinal axis of the trolley.

9. The device according to claim 5, wherein the conveying disk of the precentering assembly comprises radial housing return pushrods, which bear, under the action of compression springs, on a central bush securely fastened to the precentering core.

10. The device according to claim 5, wherein the means for vertically displacing the shaft linked with the at least one centering finger further comprises:
an inter-bearing lever mounted pivotably on a pin, the pin securely fastened to the vertical bearing and the inter-bearing lever coupled, on one side, to the shaft linked with the at least one centering finger and, on an other side, to a lower end of a vertical sliding rod, an upper end of the vertical sliding rod fitted with a nut and located along an ascending trajectory of a plate that is securely fastened to the handling trolley.

11. The device according to claim 5, wherein a periphery of the at least one centering finger is fitted with radial splines of constant angular pitch, and interacting with a radial indexing finger, said radial indexing finger mounted to slide radially in the vertical bearing and linked to means for displacing the radial indexing finger transversely at an end of a rotation of the handling trolley, about the at least one centering finger.

12. The device according to claim 1, further comprising the handling trolley wherein the handling trolley comprises a chassis having means for supporting a load and means for driving said chassis at least in a longitudinal translation motion.

13. A stationary positioning device for a handling trolley, comprising:
a single centering finger having a shape having a polygonal horizontal cross-section and a downwardly pointing trapezoidal vertical cross-section and a set of dimensions, wherein a means for connecting the centering finger to the handling trolley rotatably fastens the centering finger;
one recess located in a ring-shaped structure set into a ground structure, the recess having the same shape and set of dimensions as the centering finger;
means for displacing said centering finger between a transport position above a ground level and a positioning position where the centering finger engages the recess; and
longitudinal and transverse axes intersecting at a reference point located along a longitudinal theoretical path of the handling trolley, wherein the recess is positioned such that a vertical axis of the recess passes through the reference point and the recess has at least one side perpendicular to the theoretical longitudinal path.

14. The device according to claim 13 further comprising:
means for providing upward vertical displacement linkable to the handling trolley to provide, during the positioning phase, upward vertical displacement of at least the handling trolley to a raised position and the means for driving; and
means for tolerating a transverse displacement of the handling trolley when the handling trolley is in the raised position.

15. The device according to claim 14, wherein the means for providing upward vertical displacement of the handling trolley comprises several vertical jacks each having a body, each said body being connectable to the handling trolley and to a rod having a free end, said free end of said rod being pivotably mounted with rolling means.

16. The device according to claim 14, wherein the means for providing upward vertical displacement of the handling trolley further comprises:
means for providing in situ rotation of the handling trolley;
at least one slide for moving in vertical slideways of the handling trolley;
means for displacing the at least one slide vertically in two directions;
a lower plate connected to at least one slide and carrying a ring free to rotate, said ring connected to a rotational drive means and able to bear on the ground;
wherein the centering finger is mounted to rotate freely on a shaft so as to slide in a vertical bearing, the vertical bearing is interposed between the at least one slide to which it is securely fastened and the lower plate to which it is connected to allow transverse translation in at least one direction, and
the shaft is coupled to means for displacing the shaft vertically with respect to the vertical bearing, at least in the positioning phase of the handling trolley and wherein the lower plate carries a precentering assembly comprising:
a conveying disk mounted to float vertically with respect to the lower plate; and
a precentering core mounted to float radially with respect to the conveying disk and provided with a lower snout aligned with an upper recess, the lower snout and the upper recess having the same shape and set of dimensions as the centering finger.

17. The device according to claim 16, wherein the vertical bearing is provided with a rectangular base mounted to slide in a slideway of the lower plate.

18. The device according to claim 17, wherein the rectangular base is mounted in the slideway to allow translation perpendicular to a direction of sliding of the rectangular base in the slideway.

19. The device according to claim 17, wherein the trolley is provided with non-guiding longitudinal translation means, and the slideway of the lower plate is arranged transversely to a longitudinal axis of the trolley.

20. The device according to claim 16, wherein the conveying disk of the precentering assembly comprises radial housing return pushrods, which bear, under the action of compression springs, on a central bush securely fastened to the precentering core.

21. The device according to claim 16, wherein the means for vertically displacing the shaft linked with the centering finger further comprises:
an inter-bearing lever mounted pivotably on a pin, the pin securely fastened to the vertical bearing and the inter-bearing lever coupled, on one side, to the shaft linked with the centering finger and, on an other side, to a lower end of a vertical sliding rod, an upper end of the vertical sliding rod fitted with a nut and located along an ascending trajectory of a plate that is securely fastened to the handling trolley.

22. The device according to claim 16, wherein a periphery of the centering finger is fitted with radial splines of constant angular pitch, and interacting with a radial indexing finger, said radial indexing finer mounted to slide radially in the vertical bearing and linked to means for displacing the radial indexing finger transversely at an end of a rotation of the handling trolley, about the centering finger.

* * * * *